(12) United States Patent
Leppanen et al.

(10) Patent No.: US 10,820,120 B2
(45) Date of Patent: Oct. 27, 2020

(54) DISTRIBUTED AUDIO CAPTURE AND MIXING CONTROLLING

(71) Applicant: Nokia Technologies Oy, Espoo (FI)

(72) Inventors: Jussi Leppanen, Tampere (FI); Antti Eronen, Tampere (FI); Francesco Cricri, Tampere (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/464,913

(22) PCT Filed: Nov. 20, 2017

(86) PCT No.: PCT/FI2017/050793
§ 371 (c)(1),
(2) Date: May 29, 2019

(87) PCT Pub. No.: WO2018/100233
PCT Pub. Date: Jun. 7, 2018

(65) Prior Publication Data
US 2020/0015021 A1    Jan. 9, 2020

(30) Foreign Application Priority Data
Nov. 30, 2016   (GB) .................................. 1620328.3

(51) Int. Cl.
*H04R 3/00*       (2006.01)
*H04R 29/00*      (2006.01)
(Continued)

(52) U.S. Cl.
CPC .......... *H04R 25/407* (2013.01); *G06F 3/167* (2013.01); *H04R 1/406* (2013.01); *H04R 29/005* (2013.01);
(Continued)

(58) Field of Classification Search
CPC . H04R 3/00; H04R 3/005; H04R 1/20; H04R 1/32; H04R 1/40; H04R 1/406;
(Continued)

(56) References Cited

U.S. PATENT DOCUMENTS

2008/0101576 A1   5/2008   Vernick
2009/0279715 A1*  11/2009  Jeong ..................... H04R 3/005
                                                              381/92

(Continued)

OTHER PUBLICATIONS

Chen, X., et al., "Speaker Tracking and Identifying Based on Indoor Localization System and Microphone Array", May 21-23, 2007, 21st International Conference on Advanced Information Networking and Applications Workshops, 1 page, abstract only.

*Primary Examiner* — Thang V Tran
(74) *Attorney, Agent, or Firm* — Harrington & Smith (57) ABSTRACT

An apparatus for identifying which sound sources are associated with which microphone audio signals, the apparatus including a processor configured to: determine/receive a position/orientation of at least one sound source relative to a microphone array; receive at least one microphone audio signal, each microphone audio signal received from a microphone; receive an audio-focussed audio signal from the microphone array, wherein the audio-focussed audio signal is directed from the microphone array towards the one of the at least one sound source so as to enhance the audio-focussed audio signal; compare the audio-focussed audio signal against each microphone audio signal to identify a match between one of the at least one microphone audio signal and the audio focussed audio signal; and associate the one of the at least one microphone with the at least one sound source, based on the identified match.

20 Claims, 6 Drawing Sheets

(51) Int. Cl.
*H04R 1/32* (2006.01)
*H04S 7/00* (2006.01)
*H04R 25/00* (2006.01)
*G06F 3/16* (2006.01)
*H04R 1/40* (2006.01)
*G10L 21/0216* (2013.01)

(52) U.S. Cl.
CPC ...... H04S 7/30 (2013.01); *G10L 2021/02166* (2013.01); *H04R 2430/21* (2013.01)

(58) Field of Classification Search
CPC ...... H04R 1/326; H04R 29/00; H04R 29/004; H04R 29/005; H04R 29/006; H04R 25/407; H04R 2430/20; H04R 2430/21; H04S 7/30; H04S 7/302; H04S 7/303; H04S 7/304; G10L 2021/02166; G06F 3/16; G06F 3/165; G06F 3/167
See application file for complete search history.

(56) References Cited

U.S. PATENT DOCUMENTS

| | | | |
|---|---|---|---|
| 2011/0103191 A1* | 5/2011 | Shin | G01S 3/8006 367/125 |
| 2013/0136274 A1* | 5/2013 | Ahgren | G10L 21/02 381/92 |
| 2013/0300648 A1* | 11/2013 | Kim | G06F 3/011 345/156 |
| 2013/0301837 A1 | 11/2013 | Kim et al. | |
| 2013/0304476 A1* | 11/2013 | Kim | H04N 7/15 704/270 |
| 2014/0119568 A1* | 5/2014 | Yu | H04R 3/005 381/92 |
| 2014/0136203 A1 | 5/2014 | Liu et al. | |
| 2016/0133257 A1* | 5/2016 | Namgoong | G10L 15/26 704/235 |
| 2017/0013354 A1* | 1/2017 | Yang | H04R 3/005 |
| 2017/0332172 A1* | 11/2017 | Osako | G10L 21/0232 |

* cited by examiner

DISTRIBUTED AUDIO CAPTURE AND MIXING CONTROLLING

CROSS REFERENCE TO RELATED APPLICATION

This patent application is a U.S. National Stage application of International Patent Application Number PCT/FI2017/050793 filed Nov. 20, 2017, which is hereby incorporated by reference in its entirety, and claims priority to GB 1620328.3 filed Nov. 30, 2016.

FIELD

The present application relates to apparatus and methods for distributed audio capture and mixing. The invention further relates to, but is not limited to, apparatus and methods for distributed audio capture and mixing for spatial processing of audio signals to enable spatial reproduction of audio signals.

BACKGROUND

The capture of audio signals from multiple sources and mixing of those audio signals when these sources are moving in the spatial field requires significant manual effort. For example the capture and mixing of an audio signal source such as a speaker or artist within an audio environment such as a theatre or lecture hall to be presented to a listener and produce an effective audio atmosphere requires significant investment in equipment and training.

A commonly implemented system is one where one or more close or external microphones (for example Lavalier microphones worn by users or attached to a boom pole to capture audio signals) generate audio signals which are to be mixed with a spatial (or environmental or audio field) audio signal such that the produced source appears to come from an intended direction. As would be expected positioning a sound source within the spatial audio field requires significant time and effort to do manually.

A problem with mixing or processing of the close microphone signals is one of identifying at the mixer or processor an association between a received close microphone audio signal and the received or determined position of a close microphone. In other words how to identify or verify that a received audio signal is associated with a determined or received position. A proposed system is one where each close microphone is associated with a position tag. The position tag has a unique identifier and is configured to broadcast a radio frequency signal which may be received by a tag receiver and the position of the close microphone may be determined from the received signal. An example of a tag based system is the Nokia high accuracy indoor positioning (HAIP) system.

A tag system however has one problem in that although it is possible to estimate the position of each tag accurately it still requires significant manual effort to determine which audio signal or audio track is associated with the direction. In other words a system operator needs to manually assign tags to each audio channel, which is laborious and error prone. Since the microphones and tags are not physically attached, it is very easy to get them mixed up. This is especially true for concert type events where there are several musical acts performing one after the other. One act leaving the stage and another entering quickly can easily lead to the wrong tag being associated with a close microphone.

An automatic association method for linking close microphones/audio sources and tags would solve these problems.

SUMMARY

There is provided according to a first aspect an apparatus for identifying which sound sources are associated with which microphone audio signals, the apparatus comprising a processor configured to: determine/receive a position/orientation of at least one sound source relative to a microphone array; receive at least one microphone audio signal, each microphone audio signal received from a microphone; receive an audio-focussed audio signal from the microphone array, wherein the audio-focussed audio signal is directed from the microphone array towards the one of the at least one sound source so as to enhance the audio-focussed audio signal; compare the audio-focussed audio signal against each microphone audio signal to identify a match between one of the at least one microphone audio signal and the audio focussed audio signal; and associate the one of the at least one microphone with the at least one sound source, based on the identified match.

Each sound source may be associated with a positioning tag configured to transmit a positioning signal which may be received by a positioning receiver to determine a position/orientation of the positioning tag, and wherein the processor configured to determine the position/orientation of at least one sound source relative to a microphone array may be configured to determine the position/orientation of at least one positioning tag relative to the microphone array.

The apparatus may be configured to identify which positioning tag may be associated with which microphone within an audio scene, the audio scene may comprise: the at least one microphone, each microphone associated with a respective one of the at least one sound source; the at least one positioning tag, each positioning tag located on or neighbouring a respective microphone of the at least one microphone; the at least one microphone array, the at least one microphone array comprising or associated with a positioning tag receiver.

The processor configured to determine the position/orientation of the at least one sound source relative to a microphone array may be configured to determine an orientation angle from the microphone array to the respective microphone based on a high accuracy indoor positioning (HAIP) system estimate of the at least one positioning tag.

The processor configured to receive the audio-focussed audio signal from a microphone array may be configured to generate the audio-focussed audio signal based on the determined position/orientation.

The processor configured to compare the audio focussed audio signal against each microphone audio signal to identify the match may be configured to: align each microphone audio signal with the audio-focussed audio signal to generate at least one aligned microphone audio signal; cross-correlate each aligned microphone audio signal with the audio-focussed audio signal to generate at least one cross-correlation value; and identify the one of the at least one microphone audio signal as the match based on the cross-correlation value.

The processor configured to identify the one of the at least one microphone audio signal as the match based on the cross-correlation value may be configured to identify the one of the at least one microphone audio signal with the cross-correlation value greater than a threshold value as the match.

The processor configured to identify the one of the at least one microphone audio signal as the match based on the cross-correlation value may be configured to identify the one of the at least one microphone audio signal with a highest cross-correlation value as the match.

The processor configured to align each microphone audio signal with the audio focussed audio signal to generate at least one aligned microphone audio signal, and cross-correlate each aligned microphone audio signal with the audio focussed audio signal to generate at least one cross-correlation value may be configured to generate a generalized cross-correlation with phase transform value for each aligned microphone audio signal.

The processor configured to identify the microphone signal with a highest cross-correlation value as the match may be configured to determine the maximum value of the inverse Fourier transform of the generalized cross-correlation with phase transform values.

The processor may be further configured to compare the highest cross-correlation value against an association threshold, wherein the processor configured to associate the microphone audio signal with the at least one sound source, based on the identified match may be configured to associate the microphone with the at least one sound source based on the at least one cross-correlation value being greater than the association threshold.

The processor may be further configured to detect voice activity within at least one of the at least one microphone audio signal and the audio focussed audio signal, and wherein the processor configured to compare the audio-focussed audio signal against each microphone audio signal to identify a match between the one of the at least one microphone audio signal and the audio focussed audio signal may be configured to compare the audio-focussed audio signal against each microphone audio signal to identify a match between the microphone audio signal and the audio focussed audio signal based on the detected voice activity in the microphone audio signal.

The processor configured to compare the audio-focussed audio signal against each microphone audio signal to identify a match between the one of the at least one microphone audio signal and the audio focussed audio signal may be configured to: detect activity within only one microphone audio signal; detect activity within the audio focussed audio signal; and identify the only one microphone audio signal as being the match.

The processor configured to detect activity within the only one microphone audio signal may be configured to detect a microphone audio signal amplitude value greater than a threshold value in only one of the at least one microphone audio signal, and the processor configured to detect activity within the audio focussed audio signal may be configured to detect an audio focussed audio signal amplitude value greater than a further threshold value.

The processor configured to detect activity within the only one microphone audio signal may be configured to detect an instrument in only one of the at least one microphone audio signal, and the processor configured to detect activity within the audio focussed audio signal may be configured to detect the instrument in the audio-focussed audio signal.

The processor configured to detect activity within the only one microphone audio signal may be configured to detect voice activity in only one of the at least one microphone audio signal, and the processor configured to detect activity within the audio focussed audio signal may be configured to detect voice activity in the audio focussed audio signal.

The at least one microphone may be a close microphone and the at least one microphone audio signal may be a close microphone audio signal.

The audio-focussed audio signal may be a beam-formed audio signal which may be a result of forming a beam of the microphone array directed from the microphone array towards the at least one sound source so as to enhance the beam-formed audio signal.

The audio-focussed audio signal may be a result of selecting an array microphone of the microphone array directed from the microphone array towards the at least one sound source.

According to a second aspect there is provided a method for identifying which sound sources are associated with which microphone audio signals, the method comprising: determining/receiving a position/orientation of at least one sound source relative to a microphone array; receiving at least one microphone audio signal, each microphone audio signal received from a microphone; receiving an audio focussed audio signal from the microphone array, wherein the audio focussed audio signal is a result of forming a beam of the microphone array directed from the microphone array towards the at least one sound source so as to enhance the audio focussed audio signal; comparing the audio focussed audio signal against each microphone audio signal to identify a match between one of the at least one microphone audio signal and the audio focussed audio signal; and associating the one of the at least one microphone with the at least one sound source, based on the identified match.

The method may further comprise: providing each sound source with a positioning tag configured to transmit a positioning signal which is received by a positioning receiver to determine a position/orientation of the positioning tag, and wherein determining the position/orientation of at least one sound source relative to a microphone array comprises determining the position/orientation of the positioning tag relative to a microphone array.

The method may further comprise providing an audio scene, the audio scene comprising: the at least one microphone, each microphone associated with a respective one of the at least one sound source; the at least one positioning tag, each positioning tag located on or neighbouring a respective microphone of the at least one microphone; and the at least one microphone array, the at least one microphone array comprising or associated with a positioning tag receiver.

Determining the position/orientation of the at least one sound source relative to a microphone array may comprise determining an orientation angle from the microphone array to the respective microphone based on a high accuracy indoor positioning (HAIP) system estimate of the at least one positioning tag.

Receiving the audio-focussed audio signal from a microphone array may comprise generating the audio-focussed audio signal based on the determined position/orientation.

Comparing the audio focussed audio signal against each microphone audio signal to identify the match may comprise: aligning each microphone audio signal with the audio focussed audio signal to generate at least one aligned microphone audio signal; cross-correlating each aligned microphone audio signals with the audio focussed audio signal to generate at least one cross-correlation value; and identifying the one of the at least one microphone audio signal as the match based on the cross-correlation value.

Identifying the one of the at least one microphone audio signal as the match based on the cross-correlation value may comprise identifying the one of the at least one microphone audio signal with the cross-correlation value greater than a threshold value as the match.

Identifying the one of the at least one microphone audio signal as the match based on the cross-correlation value may comprise identifying the one of the at least one microphone audio signal with a highest cross-correlation value as the match.

Aligning each microphone audio signal with the audio focussed audio signal may comprise: generating at least one aligned microphone audio signal; and cross-correlating each aligned microphone audio signal with the audio focussed audio signal to generate a generalized cross-correlation with phase transform value for each aligned microphone audio signal.

Comparing the at least one cross-correlation value to identify the microphone audio signal with a highest cross-correlation value as the match may comprise determining the maximum value of the inverse Fourier transform of the generalized cross-correlation with phase transform values.

The method may further comprise comparing the highest cross-correlation value against an association threshold, wherein associating the microphone audio signal with the at least one sound source, based on the identified match, may comprise associating the microphone with the at least one sound source based on the highest cross-correlation value being greater than the association threshold.

The method may further comprise detecting voice activity within at least one of the at least one microphone audio signal and the audio focussed audio signal, and comparing the audio-focussed audio signal against each microphone audio signal to identify a match between the one of the at least one microphone audio signal and the audio focussed audio signal may comprise comparing the audio-focussed audio signal against each microphone audio signal to identify a match between the microphone audio signal and the audio focussed audio signal based on the detected voice activity in the microphone audio signal.

Comparing the audio-focussed audio signal against each microphone audio signal to identify a match between the one of the at least one microphone audio signal and the audio focussed audio signal may comprise: detecting activity within only one microphone audio signal; detecting activity within the audio focussed audio signal; and identifying the only one microphone audio signal as being the match.

Detecting activity within the only one microphone audio signal may comprise detecting a microphone audio signal amplitude value greater than a threshold value in only one of the at least one microphone audio signal, and detecting activity within the audio focussed audio signal may comprise detecting an audio focussed audio signal amplitude value greater than a further threshold value.

Detecting activity within the only one microphone audio signal may comprise detecting an instrument in only one of the at least one microphone audio signal, and detecting activity within the audio focussed audio signal may comprise detecting the instrument in the audio focussed audio signal.

Detecting activity within the only one microphone audio signal may comprise detecting voice activity in only one of the at least one microphone audio signal, and detecting activity within the audio focussed audio signal may comprise detecting voice activity in the audio focussed audio signal.

The at least one microphone may be a close microphone and the at least one microphone audio signal may be a close microphone audio signal.

The audio-focussed audio signal may be a beam-formed audio signal which is a result of forming a beam of the microphone array directed from the microphone array towards the at least one sound source so as to enhance the beam-formed audio signal.

The audio-focussed audio signal may be a result of selecting an array microphone of the microphone array directed from the microphone array towards the at least one sound source.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective automatic tag assignment to close microphone/audio source audio signals. In the following examples, audio signals and audio capture signals are described. However it would be appreciated that in some embodiments the apparatus may be part of any suitable electronic device or apparatus configured to capture an audio signal or receive the audio signals and other information signals.

Figure 1:
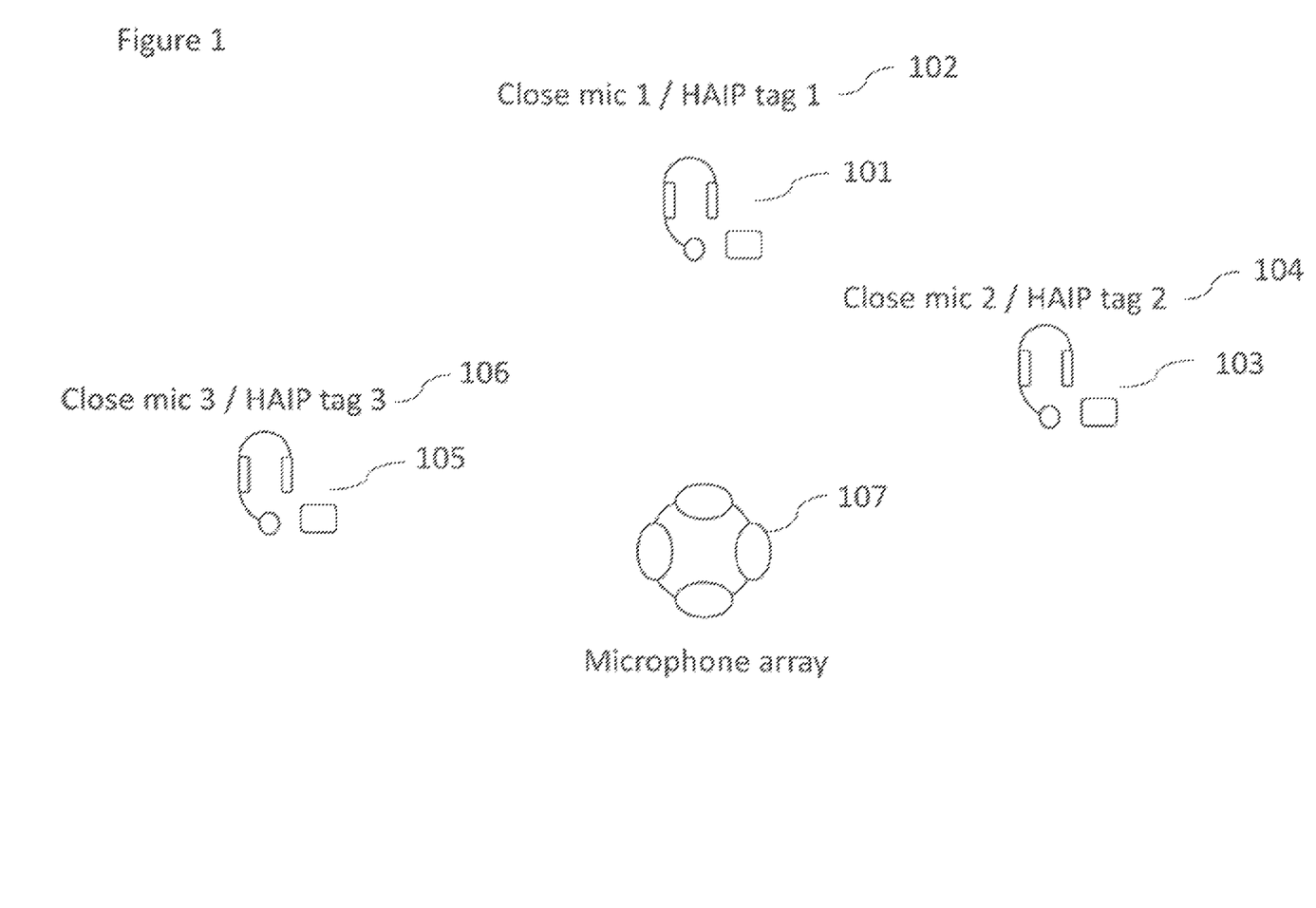
FIGS. 1 and 2 show schematically example manual assignment scenarios.

This problem is shown with respect to FIG. 1. In FIG. 1 is shown a series of close microphones (with associated high accuracy indoor positioning HAIP tags). For example FIG. 1 shows a first close microphone (close microphone 1) and an associated tag (HAIP tag 1) which are referenced as 101. Further shown are a second close microphone (close microphone 2) and an associated tag (HAIP tag 2) which are referenced as 103. Also shown are a third close microphone (close microphone 3) and an associated tag (HAIP tag 3) which are referenced as 105. Also shown is the microphone array with tag receiver (HAIP receiver 107). In FIG. 1 an operator of the system may be configured to assign the tag identifier values to the received audio signals. Thus for example the operator may make a first assignment between the audio signal of the first close microphone and the tag identified as HAIP tag 1 shown by reference 102. The operator may further make additional assignments between the audio signal of the second close microphone and the tag identified as HAIP tag 2 shown by reference 104 and also the audio signal of the third close microphone and the tag identified as HAIP tag 3 shown by reference 106.

Figure 2:
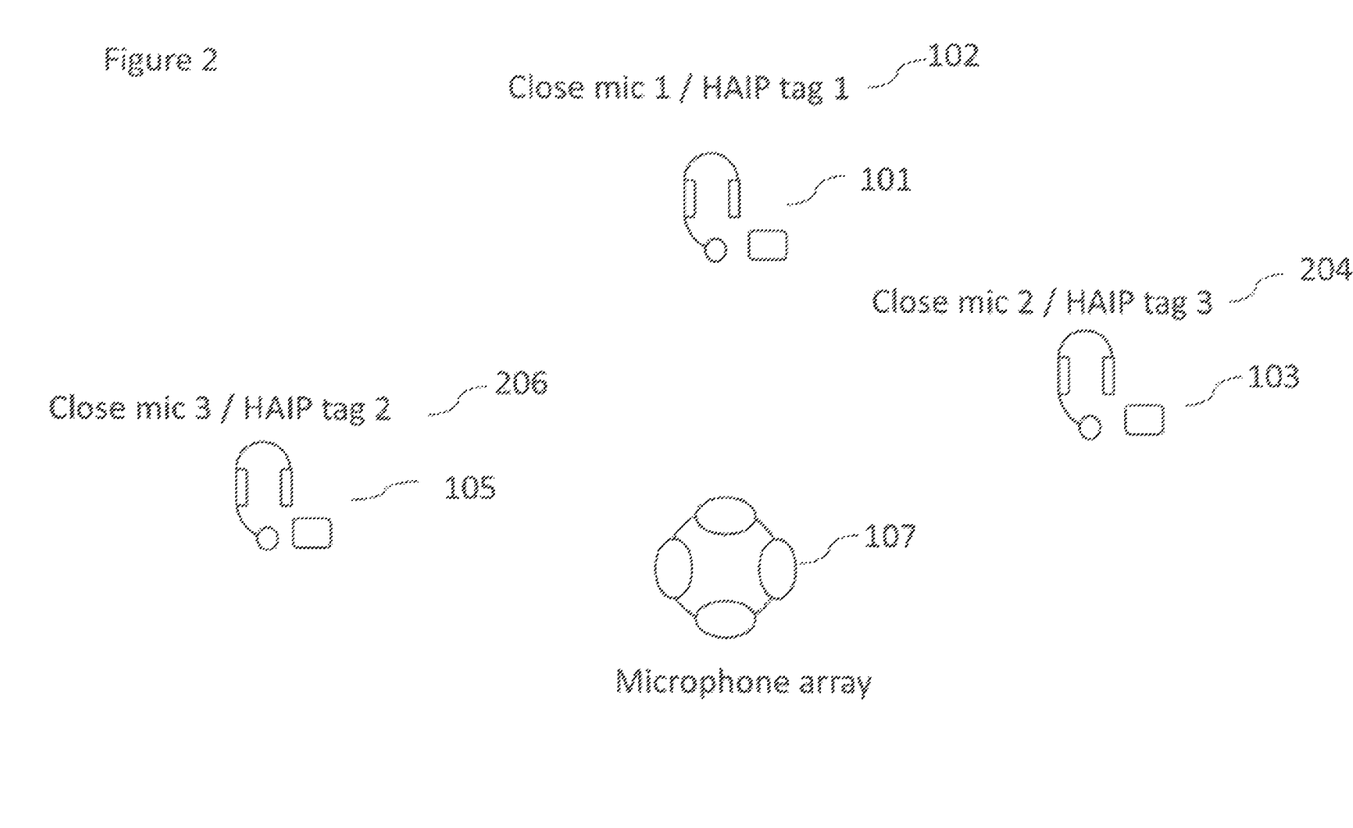

However as discussed above in some situations assignment mistakes may be made. This for example is shown in FIG. 2. In FIG. 2 the same series of close microphones (with associated high accuracy indoor positioning HAIP tags) are shown. For example the first close microphone (close microphone 1) and associated tag referenced as 101, the second close microphone (close microphone 2) and associated tag referenced as 103, and third close microphone (close microphone 3) and associated tag referenced as 105. In FIG. 2 an operator of the system correctly assigns the audio signal of the first close microphone and the tag identified as HAIP tag 1 (in other words the tag associated with the first microphone) shown by reference 102. However the operator in the example shown in FIG. 2 incorrectly assigns the tag identifier values associated with the second close microphone to the audio signal of the third close microphone and the tag identifier value associated with the third close microphone to the audio signal of the second close microphone. Thus for example the operator makes the assignment close mic 2/HAIP tag 3 shown by reference 204 and close microphone 3/HAIP tag 3 shown by reference 206.

The concept which is described in embodiments in further detail hereafter is the implementation of a system and method for the association of positioning (HAIP) tags and close microphones (which may also be referred to as audio or sound sources). The embodiments as described hereafter comprise a system configured to capture data on:
   a. Positioning tag (HAIP) position/angle-of-arrival data;
   b. Audio data from close microphones/audio (sound) sources; and
   c. Audio data from the microphone array (for example the OZO device microphone array.

Having obtained this information for each positioning (HAIP) tag the system is configured to determine angle-of-arrival data for the positioning tag relative to the microphone array. The system may then perform audio beamforming in the directions of the angles-of-arrival using the audio data from the microphone array and store the resulting beamformed audio signal. The system may then be configured for each close microphone audio signal compare the close microphone audio signal to the beamformed audio signal (following an audio alignment process). The system may then be configured to determine the close microphone audio signal which best matches the beamformed audio signal. The system may then associate the close microphone audio signal which provided the matching close microphone audio signal with the current positioning (HAIP) tag.

In configuring the system to implement the above processes it is possible to associate all positioning (HAIP) tags with all close microphones (and their audio signals). As a result, any Spatial Audio Mixing system or other automatic panning system is able to create high quality spatial audio scenes where sound objects are associated to the correct positioning tags.

Figure 3:
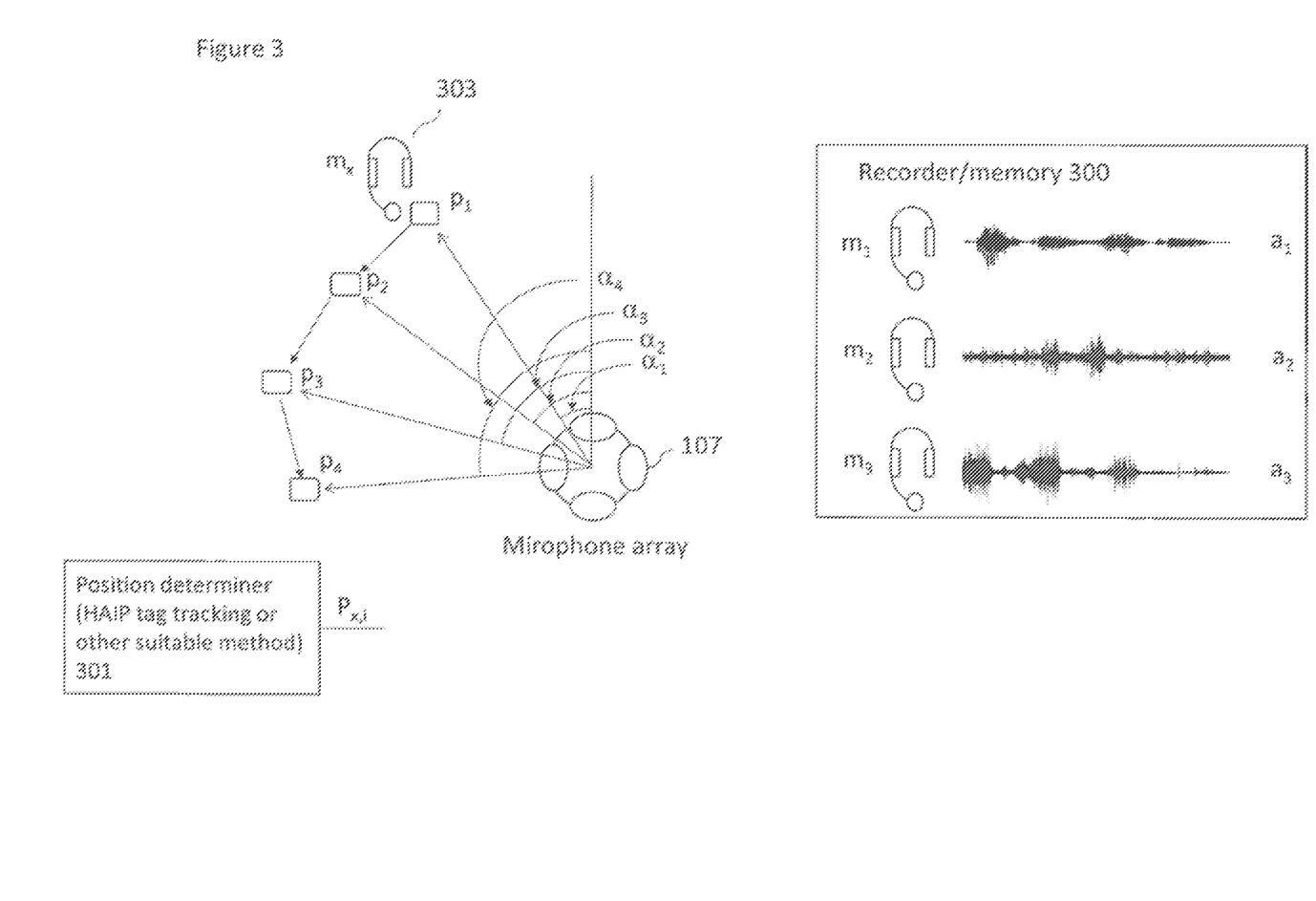
FIG. 3 shows schematically 'close microphone recorder' and 'close microphone position determiner' parts of the system according to some embodiments.

In FIG. 3 the 'close microphone recorder' and 'close microphone position determiner' parts of the system according to some embodiments are shown. In this example there are three example close microphones of which their tags are currently unknown or unassigned. Furthermore the system comprises a microphone array 107. In this example the microphone array 107 is part of an OZO camera comprising a positioning tag (HAIP) receiver array however in some embodiments the positioning tag (HAIP) receiver array is separate from the microphone array and the microphone array may be equipped with a positioning tag of its own enabling the positioning tag to determine the position of the close microphone tags relative to the microphone array tags.

In the example shown in FIG. 3 there is shown a recorder/memory 300 configured to store the audio signals $a_1$, $a_2$, $a_3$ from close microphones $m_1$, $m_2$, $m_3$ respectively. Each of the close microphones $m_1$, $m_2$, $m_3$ has positioning (HAIP) tags which generates a positioning signal received by the positioning tag receiver array. However the positioning tag receiver array/system does not know which close microphone and also which close microphone audio signal the positioning tag is associated with.

FIG. 3 shows a close microphone position determiner 301. The close microphone position determiner 301 may in some embodiments be configured to receive the output of the positioning tag receiver array and be configured to determine position data associated with position tags. The close microphone position determiner may be configured to output positions of an 'unknown' or 'unassigned' tag over time. This is shown in FIG. 3 by the position of unknown tag x at times i shown as the output $P_{x,i}$. FIG. 3 furthermore shows the position of unknown or unassigned tag 303 and the positions of the unknown or unassigned tag 303 $p_1$ at time t=1, $p_2$ at time t=2, $p_3$ at time t=3, $p_4$ at time t=4 values.

In some embodiments the position determiner is further configured to determine an angle of arrival or orientation relative to the microphone array of the unknown or unassigned tag. For example as shown in FIG. 3 the example unknown tag 303 has an orientation $\alpha_1$ when at position $p_1$, $\alpha_2$ when at position $p_2$, $\alpha_3$ when at position $p_3$, and $\alpha_4$ when at position $p_4$. In some embodiments the orientation is output by the position determiner 301.

Figure 4:
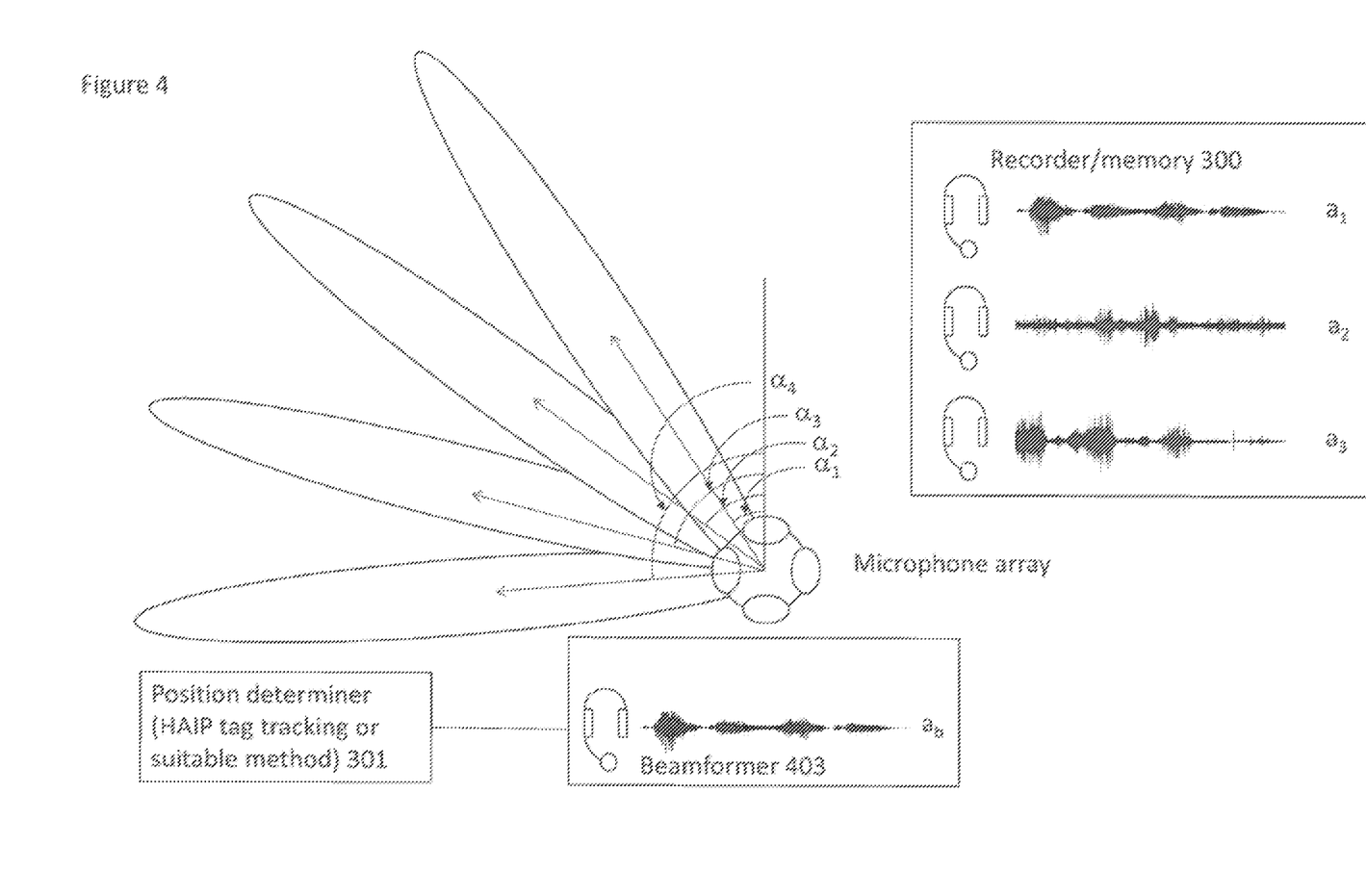
FIG. 4 shows schematically a further beamformer part of the system according to some embodiments.

FIG. 4 shows schematically a further beamformer part of the system according to some embodiments. The beamformer 403 is configured to generate a beamformed audio signal $a_b$ based on the output of the microphone array where the beam is directed towards the determined tag orientation (or position). Thus as shown in FIG. 4 the beamformer 403 is configured at $t_1$ to direct the beam on orientation $\alpha_1$, at $t_2$ to direct the beam on orientation $\alpha_2$, at $t_3$ to direct the beam on orientation $\alpha_3$, and at $t_4$ to direct the beam on orientation $\alpha_4$.

Figure 5:
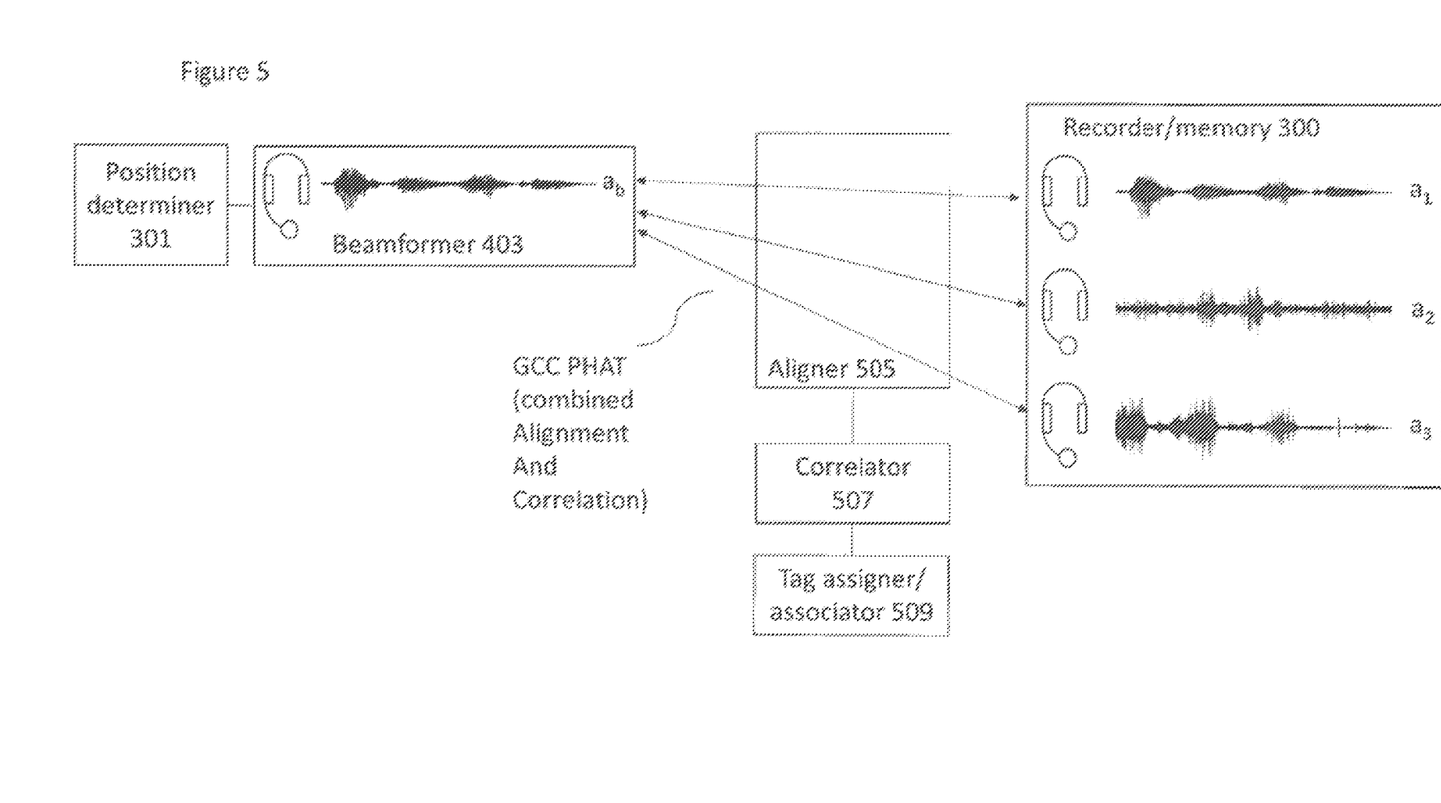
FIG. 5 show schematically 'aligner', 'correlator' and 'tag assigner' parts of the system according to some embodiments.

FIG. 5 shows schematically an aligner 505, a correlator 507 and a tag assigner 509 parts of the system according to some embodiments. The parts shown in FIG. 5 show that once the close microphone audio signals and the beamformed audio signal are determined/recorded, these audio signals can be compared to determine which close microphone audio signal corresponds to the beamformed audio signal. Since the beamformed audio was obtained based on the positions of a tag, which close microphone (audio signal) to be associated with this tag can be found. In some embodiments the comparison is a two stage process of alignment and cross-correlation performed by an aligner 505 and correlator 507 respectively.

In some embodiments the aligner 505 is configured to receive the output of the beamformer 403 and the close microphone recorder 300 and attempt to align the beamformed audio signal $a_b$ with each of the recorded close microphone audio signals $a_1$, $a_2$, $a_3$.

In some embodiments the correlator 507 is configured to receive the time aligned audio signals and perform a cross-correlation of pairs selected from the beamformed audio signal and one of the close microphone audio signals. For example cross correlations of the pairs $(a_b,a_1)$ $(a_b,a_2)$ and $(a_b,a_3)$ are performed and their cross-correlation values stored.

In some embodiments the alignment and correlation operations may be performed using a generalized cross-correlation with phase transform (GCC-PHAT) operation. In such embodiments a GCC-PHAT value is calculated for each close microphone audio signal and the beamformed audio signal.

The GCC-PHAT cross-correlation between two signals $x_i(n)$ and $x_j(n)$ may be calculated as follows.

$$G_{PHAT,i,j}(f) = \frac{X_i(f)[X_j(f)]^*}{|X_i(f)[X_j(f)]^*|},$$

where $X_i(f)$ is the Fourier transform of $x_i(n)$.

From this we may calculate the maximum correlation value $C_{PHAT}$ by using $$C_{PHAT}(i, j) = \max_d(R_{PHAT,i,j}(d)),$$

where $R_{PHAT}(d)$ is the inverse Fourier transform of $G_{PHAT}(f)$.

In this example the cross correlation value $C_{PHAT}(b,i)$ is calculated for the beamformed signal $x_b(n)$ and all close microphone audio signals $x_i(n)$.

In some embodiments a tag assigner 509 is further configured to then assign the tag to the close microphone which has the highest match between the beamformed audio signal and the close microphone audio signal. This match may be the greatest GCC-PHAT value or cross-correlation value.

In some embodiments a threshold on the correlation value may be imposed such that the association of the close microphone (and the close microphone audio signal) and the tag is dependent on whether or not the correlation value is higher than the threshold. For example, in the case the system or the method operates when no one is speaking into the microphones, the correlation value would be low for each comparison, so the system may decide to continue monitoring and analyzing the data. In some embodiments the system may furthermore comprise a voice/instrument detector (for example a voice activity detector (VAD) or other thresholding mechanism) for selecting suitable times for performing the time-alignment.

In some embodiments where only one speaker or close microphone or audio source or sound source is producing audio at a time, instead of using correlations we may use a simple audio activity detector on the close microphone and on the beamformed audio. In these embodiments each microphone array (OZO) audio beam in the direction of each position (HAIP) tag is analyzed, and if there is a detected audio activity at the beam this close microphone for which we have previously detected audio activity is associated with the corresponding tag.

Figure 6:
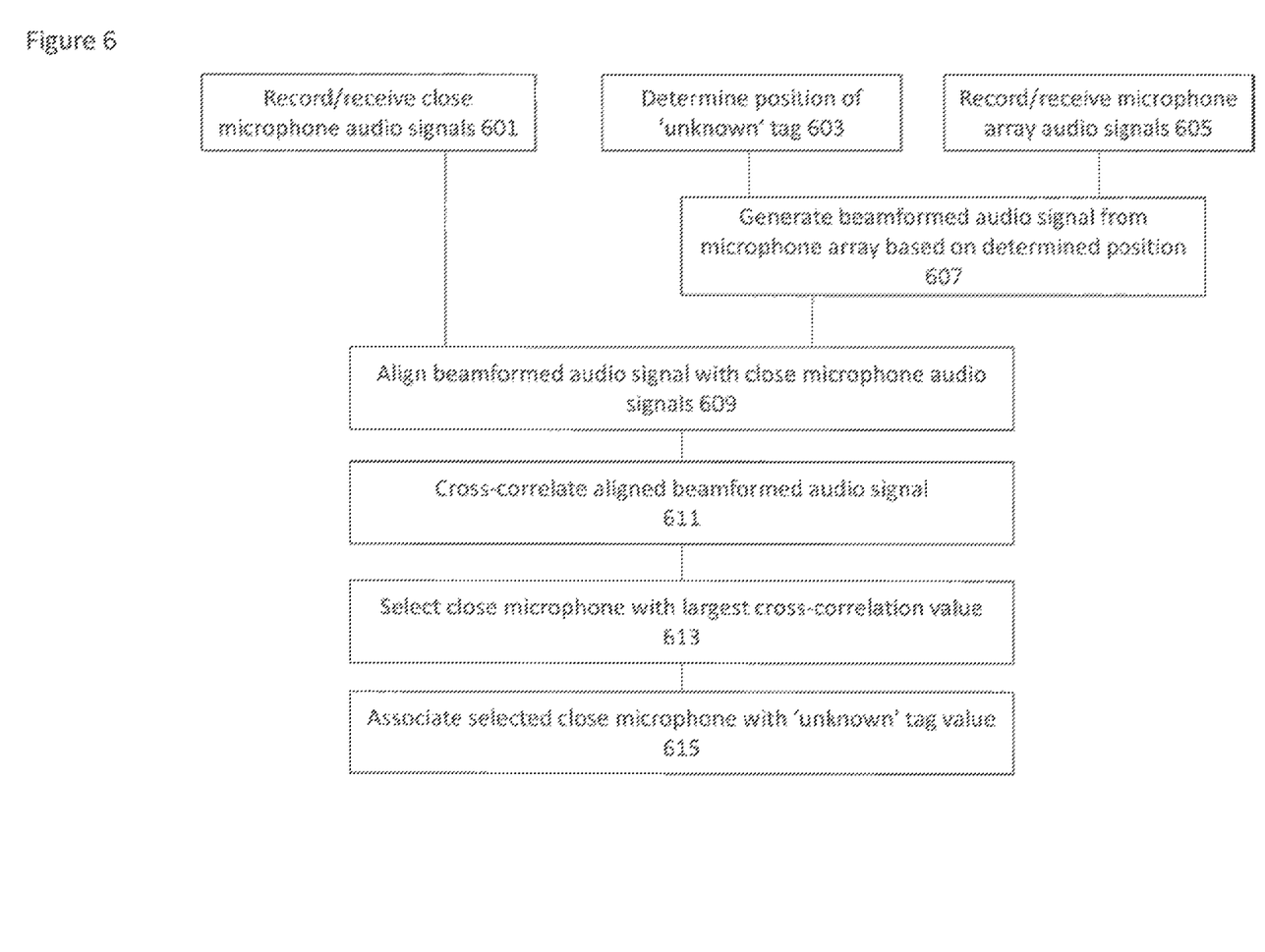
FIG. 6 shows a flow diagram of the method of tag assignment according to some embodiments.

With respect to FIG. 6 an example flow diagram of the operation of the system is shown in further detail.

In some embodiments the close microphone audio signals are received/recorded.

The operation of receiving/recording the close microphone audio signals is shown in FIG. 6 by step 601.

While the close microphone signals are being received/recorded the unknown or unassigned tag positions (orientations) are determined.

The operation of determining the unknown or unassigned tag positions (orientations) is shown in FIG. 6 by step 603.

Furthermore while the close microphone signals are being received/recorded the microphone array audio signals are received/recorded.

The operation of receiving/recording the microphone array audio signals is shown in FIG. 6 by step 605.

The system, for example the beamformer, is configured to generate a beamformed audio signal based on the microphone array audio signals, where the beam is based on the determined position/orientation of the tag.

The operation of generating the beamformed audio signal is shown in FIG. 6 by step 607.

The aligner may then align the beamformed audio signal with the close microphone audio signals.

The operation of aligning the beamformed audio signal with the close microphone audio signals is shown in FIG. 6 by step 609.

The correlator may then be configured to generate cross-correlation values associated with the aligned audio signals.

The operation of generating cross-correlation values between the aligned beamformed audio signal and the close microphone audio signals is shown in FIG. 6 by step 611.

The system may then select the close microphone (or close microphone audio signal) which has the largest cross-correlation value with the aligned beamformed audio signal.

The operation of selecting the close microphone with the largest cross correlation value is shown in FIG. 6 by step 613.

The system may then assign the selected close microphone (and therefore the selected close microphone audio signal) the tracked tag identifier.

The operation of associating or assigning the 'unknown' tag value with the selected close microphone is shown in FIG. 6 by step 615.

The system and methods described herein describe only part of the whole mixing and processing system and specifically the assignment of association of close microphones with position (HAIP) tags in such a way that subsequent processing, mixing and rendering operations which are not described in further detail are able to correctly associate a microphone audio signal with a position determined from the associated tag and thus process/mix/render the correct microphone signal or signal derived from the correct microphone.

The close microphones and/or microphone array microphones may be transducers configured to convert acoustic waves into suitable electrical audio signals. In some embodiments the microphones can be solid state microphones. In other words the microphones may be capable of capturing audio signals and outputting a suitable digital format signal. In some other embodiments the microphones or microphone array can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone.

In some embodiments the functional elements described herein such as the position determiner 301, beamformer 403, recorder 300, aligner 505, correlator 507 and tag assigner 509 may be implemented by a processor configured to execute various program codes.

In some embodiments the device comprises a memory. In some embodiments the at least one processor is coupled to the memory. The memory can be any suitable storage means. In some embodiments the memory comprises a program code section for storing program codes implementable upon the processor. Furthermore in some embodiments the memory can further comprise a stored data section for storing data, for example the recorded close microphone audio signals, the microphone array audio signals or other data that has been processed or to be processed in accordance with the embodiments as described herein. The implemented program code stored within the program code section and the data stored within the stored data section can be retrieved by the processor whenever needed via the memory-processor coupling. The device may comprise a transceiver coupled to the processor and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the electronic device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for identifying which sound sources are associated with which microphones, the apparatus comprising a processor configured to:
    determine/receive a position/orientation of at least one sound source relative to a microphone array, wherein the sound soyrces comprise the at least one sound source;
    receive at least one microphone audio signal, wherein the at least one microphone audio signal is received from a respective one of at least one microphone, wherein the microphones comprise the at least one microphone;
    receive an audio-focussed audio signal from the microphone array, wherein the audio-focussed audio signal is directed from the microphone array towards the at least one sound source so as to enhance the audio-focussed audio signal;
    compare the audio-focussed audio signal against the at least one microphone audio signal to identify a match between one of the at least one microphone audio signal and the audio-focussed audio signal; and
    associate a respective microphone of the at least one microphone from which the one microphone audio signal was received with the at least one sound source, based on the identified match, wherein the associating comprises associating a position/orientation of the respective microphone, relative to the microphone array, with the determined/received position/orientation of the at least one sound source relative to the microphone array.

2. The apparatus as claimed in claim 1, wherein the at least one sound source is associated with a respective positioning tag configured to transmit a respective positioning signal which is received with a positioning receiver to determine a position/orientation of the respective positioning tag, and wherein the processor configured to determine the position/orientation of the at least one sound source relative to the microphone array is configured to determine a position/orientation of at least one positioning tag relative to the microphone array.

3. The apparatus as claimed in claim 2, wherein the apparatus is configured to identify which positioning tags are associated with which of the microphones within an audio scene, the audio scene comprising:
    the at least one microphone, wherein a respective microphone of the at least one microphone is associated with a respective one of the at least one sound source;

the at least one positioning tag, wherein a respective positioning tag of the at least one positioning tag is located on or neighbouring the at least one microphone, wherein the positioning tags comprise the at least one positioning tag; and the microphone array, the microphone array comprising or associated with the positioning receiver.

4. The apparatus as claimed in claim 2, wherein the processor configured to determine the position/orientation of the at least one sound source relative to the microphone array is configured to determine an orientation angle from the microphone array to the at least one microphone.

5. The apparatus as claimed in claim 1, wherein the processor configured to receive the audio-focussed audio signal from the microphone array is configured to generate the audio-focussed audio signal based on the determined position/orientation.

6. The apparatus as claimed in claim 1, wherein the processor configured to compare the audio-focussed audio signal against the at least one microphone audio signal to identify the match is configured to:
align a respective one of the at least one microphone audio signal with the audio-focussed audio signal to generate at least one aligned microphone audio signal;
cross-correlate a respective one of the at least one aligned microphone audio signal with the audio-focussed audio signal to generate at least one cross-correlation value; and
identify the match between the one of the at least one microphone audio signal and the audio-focussed audio signal based on the at least one cross-correlation value.

7. The apparatus as claimed in claim 6, wherein the processor configured to at least one of:
identify the match between the one of the at least one microphone audio signal and the audio-focussed audio signal based on the at least one cross-correlation value is configured to identify the one of the at least one microphone audio signal with a respective cross-correlation value greater than a threshold value as the one of the at least one microphone audio signal; or
identify the match between the one of the at least one microphone audio signal and the audio-focussed audio signal based on the at least one cross-correlation value is configured to identify the one of the at least one microphone audio signal with a highest cross-correlation value as the one of the at least one microphone audio signal.

8. The apparatus as claimed in claim 6, wherein the processor configured to align the respective one of the at least one microphone audio signal with the audio-focussed audio signal to generate the at least one aligned microphone audio signal, and cross-correlate the respective one of the at least one aligned microphone audio signal with the audio-focussed audio signal to generate the at least one cross-correlation value is configured to generate a respective generalized cross-correlation with phase transform value for the at least one aligned microphone audio signal.

9. The apparatus as claimed in claim 7, wherein the processor configured to identify the microphone audio signal with the highest cross-correlation value as the one of the at least one microphone audio signal is configured to determine a maximum value of an inverse Fourier transform of a generalized cross-correlation with phase transform values.

10. The apparatus as claimed in claim 7, wherein the processor is further configured to compare the highest cross-correlation value against an association threshold, wherein the processor configured to associate the respective microphone from which the one microphone audio signal was received with the at least one sound source, based on the identified match is configured to associate the respective microphone with the at least one sound source based on the highest cross-correlation value being greater than the association threshold.

11. The apparatus as claimed in claim 6, wherein the processor is further configured to detect voice activity within at least one of the at least one microphone audio signal and within the audio-focussed audio signal, and wherein the processor configured to compare the audio-focussed audio signal against the at least one microphone audio signal to identify a match between the one of the at least one microphone audio signal and the audio-focussed audio signal is configured to compare the audio-focussed audio signal against the at least one microphone audio signal to identify the match between the one microphone audio signal and the audio-focussed audio signal based on the detected voice activity in the one microphone audio signal.

12. The apparatus as claimed in claim 1, wherein the processor configured to compare the audio-focussed audio signal against the at least one microphone audio signal is further configured to:
detect activity within the one microphone audio signal;
detect activity within the audio-focussed audio signal; and
identify the match between the one microphone audio signal and the audio-focussed audio signal based, at least partially, on the detected activity within the one microphone audio signal and the detected activity within the audio-focussed audio signal.

13. The apparatus as claimed in claim 12, wherein the processor configured to detect activity within the one microphone audio signal is configured to detect a microphone audio signal amplitude value greater than a threshold value, and the processor configured to detect activity within the audio-focussed audio signal is configured to detect an audio-focussed audio signal amplitude value greater than a further threshold value.

14. The apparatus as claimed in claim 12, wherein the processor configured to detect activity within the one microphone audio signal is configured to detect at least one of:
an instrument in the one microphone audio signal, and the processor configured to detect activity within the audio-focussed audio signal is configured to detect the instrument in the audio-focussed audio signal; or
voice activity in the one microphone audio signal, and the processor configured to detect activity within the audio-focussed audio signal is configured to detect the voice activity in the audio-focussed audio signal.

15. The apparatus as claimed in claim 1, wherein the at least one microphone comprises a lavalier microphone and the at least one microphone audio signal comprises a close microphone audio signal.

16. The apparatus as claimed in claim 1, wherein the audio-focussed audio signal is a beam-formed audio signal which is a result of forming a beam of the microphone array directed from the microphone array towards the at least one sound source so as to enhance the at least one sound source.

17. A method for identifying which sound sources are associated with which microphones, the method comprising:
determining/receiving a position/orientation of at least one sound source relative to a microphone array, wherein the sound sources comprise the at least one sound source;
receiving at least one microphone audio signal, wherein the at least one microphone audio signal is received from a respective one of at least one microphone, wherein the microphones comprise the at least one microphone;

receiving an audio-focussed audio signal from the microphone array, wherein the audio-focussed audio signal is directed from the microphone array towards the at least one sound source so as to enhance the audio-focussed audio signal;

comparing the audio-focussed audio signal against the at least one microphone audio signal to identify a match between one of the at least one microphone audio signal and the audio-focussed audio signal; and associating a respective of the at least one microphone microphone from which the one microphone audio signal was received with the at least one sound source, based on the identified match, wherein the associating comprises associating a position/orientation of the respective microphone, relative to the microphone array, with the determined/received position/orientation of the at least one sound source relative to the microphone array.

18. The method as claimed in claim 17, further comprising:

providing the at least one sound source with a respective positioning tag configured to transmit a respective positioning signal which is received with a positioning receiver to determine a position/orientation of the respective positioning tag, and wherein determining the position/orientation of the at least one sound source relative to the microphone array comprises determining a position/orientation of at least one positioning tag relative to the microphone array.

19. The method as claimed in claim 17, wherein comparing the audio-focussed audio signal against the at least one microphone audio signal to identify the match comprises:

aligning a respective one of the at least one microphone audio signal with the audio-focussed audio signal to generate at least one aligned microphone audio signal;

cross-correlating a respective one of the at least one aligned microphone audio signals with the audio-focussed audio signal to generate at least one cross-correlation value; and identifying the match between the one of the at least one microphone audio signal and the audio-focussed audio signal based on the at least one cross-correlation value.

20. The method as claimed in claim 17, wherein comparing the audio-focussed audio signal against the at least one microphone audio signal to identify a match between the one of the at least one microphone audio signal and the audio-focussed audio signal comprises:

detecting activity within the one microphone audio signal;

detecting activity within the audio-focussed audio signal; and identifying the match between the one microphone audio signal and the audio-focussed audio signal based, at least partially, on the detected activity within the one microphone audio signal and the detected activity within the audio-focussed audio signal.

\* \* \* \* \*

UNITED STATES PATENT AND TRADEMARK OFFICE
CERTIFICATE OF CORRECTION

PATENT NO. : 10,820,120 B2
APPLICATION NO. : 16/464913
DATED : October 27, 2020
INVENTOR(S) : Jussi Leppanen et al.

It is certified that error appears in the above-identified patent and that said Letters Patent is hereby corrected as shown below:

In Claim 1:
Column 12, Line 27, "soyrces" should be deleted and --sources-- should be inserted.

In Claim 17:
Column 15, Lines 13-14, "respective of the at least one microphone microphone" should be deleted and --respective microphone of the at least one microphone-- should be inserted.

Signed and Sealed this
Twenty-second Day of December, 2020

Andrei Iancu
*Director of the United States Patent and Trademark Office*